Feb. 14, 1939.  C. G. OLSON  2,147,210
LOCKING DEVICE
Filed April 2, 1936
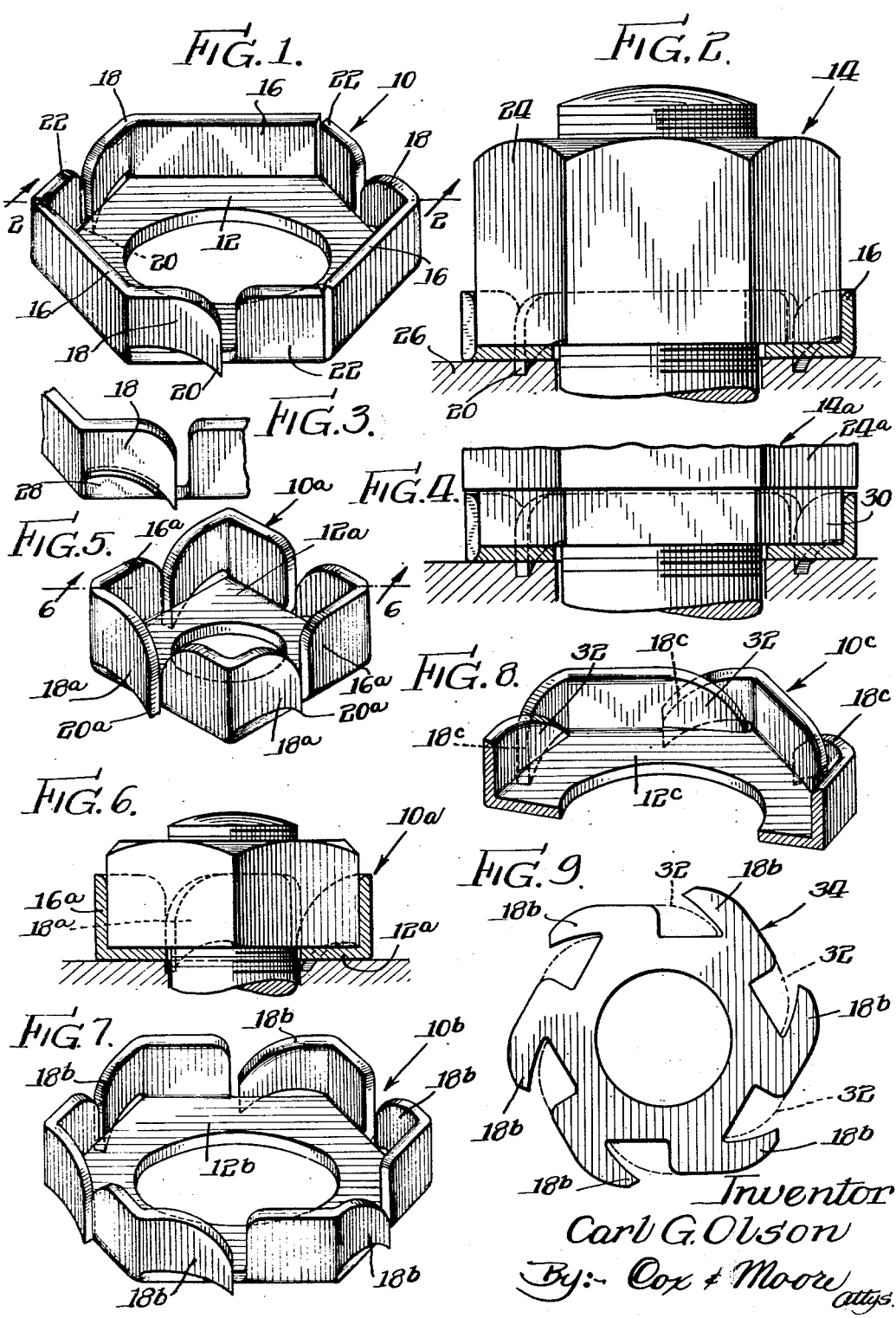
Inventor
Carl G. Olson
By:- Cox & Moore attys.

Patented Feb. 14, 1939

2,147,210

UNITED STATES PATENT OFFICE 2,147,210

LOCKING DEVICE

Carl G. Olson, Chicago, Ill., assignor to Illinois Tool Works, Chicago, Ill., a corporation of Illinois Application April 2, 1936, Serial No. 72,293

7 Claims. (Cl. 151—46)

This invention relates generally to locking devices, and more particularly to locking devices for rotary clamping members, such as nuts, screw heads, and the like.

Difficulty has been experienced heretofore in the use of conventional locking devices, such as lock washers, in association with nuts having clamping surfaces of relatively small radial width. Conventional lock washers—for example, the type provided with resilient radial locking teeth or prongs—are not particularly adapted for these narrow clamping surfaces. It is therefore an important object of this invention to overcome the above mentioned inconveniences and difficulties by providing a locking device which permits the entire clamping surface of a nut to function for its intended purpose, and also provides means for effectively securing said nut against retrograde movement.

Another object of the present invention is to provide a locking device which is particularly adapted to be used with hardened nuts or screw heads. To this end I propose to provide a locking device which on one side is adapted to grip the periphery of the nut or screw head, and on the opposite side is adapted to dig into the softer surface of the work against which the nut may be tightened.

More specifically, my invention contemplates a locking device, as set forth above, wherein teeth adapted to embed themselves within the surface of the work are positioned wholly outside the periphery of the nut or screw head which is gripped to secure the parts against relative rotation.

Another object of the present invention is to provide a novel combination with a locking device and screw head or nut, whereby to facilitate the handling of nuts and washers in the field.

The foregoing and numerous other objects and advantages will be more apparent from the following detailed description when considered in connection with the accompanying drawing, wherein—

Figure 1 is a perspective view of a locking device embodying features of my invention;

Figure 2 is a transverse sectional view, taken substantially along the line 2—2 of Figure 1, of the locking device and clamping member or nut in operative association with a work surface;

Figure 3 is a slightly modified arrangement of the locking device shown in Figures 1 and 2;

Figure 4 discloses the locking device of Figures 1 and 2 associated with a peripherally recessed nut, whereby to prevent the projection of the locking prongs beyond the confines of the larger periphery of the nut;

Figure 5 discloses the invention as applied to a locking device particularly adapted for a square nut or screw head;

Figure 6 is a transverse sectional view of the device in Figure 5 in operative association with a square nut, said view being taken substantially along the line 6—6 of Figure 5;

Figure 7 discloses a locking device embodying my invention particularly adapted for hexagonal nuts and having locking prongs provided on all six sides;

Figure 8 is a fragmentary perspective view of a locking device slightly modified from that shown in Figure 7; and Figure 9 discloses the blank from which the locking device of Figure 7 may be made, dotted lines indicating the manner in which the blank would be formed to produce the device shown in Figure 8.

Referring now to the drawing wherein I have employed like numerals to designate parts which are similar throughout the various views, it will be seen that one embodiment of my invention, as shown in Figures 1 and 2, includes a locking device designated generally by the numeral 10. This locking device has an annular bearing or body portion 12 adapted to receive the clamping surface of a conventional clamping member such as the nut 14 shown in Figure 2. The device 10 is particularly designed to accommodate a hexagonal clamping member or nut, and includes three upstanding wall or flange sections 16. These sections 16 are formed by bending the stock at right angles to the plane of the bearing section 12. Formed integral with and extending from one extremity of each section 16 is a locking member or prong 18. Each prong is provided with a work engaging tooth 20, which normally projects below the under-surface of the bearing section 12. Additional wall or flange sections 22 are provided in the vicinity of the free extremities of the prongs 18.

The wall sections 16 are preferably flexed slightly inward so that, when the nut 14 is inserted within the aperture presented by these wall sections, the external or peripheral surfaces 24 of the nut complementary to the section 16 will be resiliently gripped thereby. In this manner the nut and locking device 10 present a combined unitary locking device. After the nut and locking device have been impositively secured together as a unit in the manner just described and are tightened as a unit against the surface of a work piece 26 (Figure 2), the teeth 20 are caused to embed themselves within said work. In this connection it will be noted that, while the prongs 18 are in themselves substantially rigid, the flange section 16 complementary to each prong has a resilient hinge connection with the annular section 12. Thus, any tendency to force the teeth 20 upwardly is resisted by the resilient connection between the section 16 and the bearing section 12. This resistance is sufficient to cause the teeth 20 to embed themselves within the work 26. After the combined nut and locking device or washer have been tightened against the work, these resiliently connecting sections 16 serve to maintain the teeth 20 in their embedded or locking position. It will be noted that the prongs are so shaped that the teeth will afford less resistance to rotation when rotated in a clockwise direction, as viewed in Figures 1 and 2, than when rotated in a counter-clockwise direction. Hence, any tendency to impart retrograde movement to the combined nut and washer from the position shown in Figure 2 will be vigorously resisted by the teeth 20 embedded within the work.

The flange sections 22 embrace the side of the nut and thereby take up a portion of the load exerted by the sides 24 of the nut when the locking device 10 is tightened against the work piece. These sections 22 assist in preventing the lateral deflection of the prongs or spurs 18 during the tightening of the nut. To further eliminate the possibility of outward or lateral shifting of the prongs 18, I provide, as shown in Figure 3, flange sections 28 which are complementary to each prong, said sections 28 being connected directly with the bearing or base section, such as the section 12 of Figure 1. These sections 28 serve to take up the forces which have a tendency to shift the prong 18 outwardly when an unscrewing force is applied to the nut. The sections 28 are more rigid than either the prongs 18 or the sections 16 and are sufficient to withstand the forces exerted by the nut surfaces 24.

In Figure 4 I have shown the manner in which the washer or locking device 10 may be associated with a nut in such a manner as to retain the wall sections of the locking device within the peripheral confines of the main body of the nut. In Figure 4 a nut 14a is provided with a peripheral recess 30. This enables the wall sections 16 and 28, as well as the prongs or spurs 18, to be retained inside of the peripheral confines of the sides 24a. The device of Figure 4 is more neat in appearance than that of Figure 2.

In Figures 5 and 6 I have shown a locking device designated generally by the numeral 10a, which is similar to the locking device 10, but is particularly designed for a square headed nut or bolt head. This device is provided with an annular bearing section 12a, resilient side sections or flanges 16a, and prongs or spurs 18a projecting from one end of each of the sections 16a. Each prong is formed with a work engaging tooth 20a.

In Figure 7 I have shown a locking device or washer 10b, which is similar to the device 10 of Figures 1 and 2, except that prongs 18b are provided for each of the six sides of the nut 14, as distinguished from the three prongs 18 shown in Figure 1.

In Figure 8 I have shown still another modification 10c which is similar in many respects to the devices 10 and 10b. This locking device 10c is designed for use with hexagon nuts or bolt heads and like the device 10b is provided with locking prongs 18c for all six sides of the nut 14. The device 10c differs from the structure of Figure 7 only in the provision of extensions or sections 32 which overlap the prongs 18c. These sections 32 function similarly to the sections 28 shown in Figure 3 in resisting the tendency of the nut surfaces 24 to force the wall sections outwardly. In other words, these sections 32, like the sections 28, take up the load or force exerted by the nut surfaces 24, and thus prevent the complementary prongs 18c from being forced outwardly.

In Figure 9 a blank designed generally by the numeral 34 is shown, from which the locking device 10b may be formed. Dotted lines in Figure 9 indicate the manner in which the blank could be modified for making the washer shown in Figure 8.

From the foregoing, it will be apparent that my invention contemplates the provision of a locking device, which is particularly adapted to be used with nuts or screw heads not adapted to receive the locking teeth of conventional lock washers. The invention has a very practical application to nuts or screw heads wherein the radial width of the clamping surfaces is not sufficient to permit the use of conventional lock washers, and also has a very practical application to nuts and screw heads which are hardened to such an extent as to preclude the use of conventional lock washers. The device may be made by practicing conventional machine shop methods, it being only necessary to first form a suitable blank from spring stock and subsequently bend or form sections of the blank so as to present the completed washer or locking device. In addition to providing a locking device having an effective resilient locking action, the invention also provides a very practical and novel combination of a clamping device and washer, namely, a nut and washer unit. These devices may be assembled at a point of manufacture and shipped to the user for immediate application to the work. This is of particular advantage in high production industries such as the automotive industry where the time required for an operator to first select one part, then select the other part, and subsequently combine both of said parts to the work, introduces a factor which materially contributes to the ultimate cost to the consumer. The combined nut and washer arrangement described herein serves to materially reduce the time of assembly at the place where washers and nuts are applied. By having the elements such as the locking prongs positioned externally of the clamping or bearing surface, my device is rendered most practical for its intended purpose. Furthermore, the rigidity of the prongs in combination with the resiliency of the supporting elements or wall sections provides a very effective spring locking arrangement.

It will be clear from the foregoing description that the wall sections or flanges extending laterally from the apertured body portion or bearing section constitute coupling means for engaging the periphery of the rotary clamping member or nut. In other words, these wall sections or flanges establish the driving coupling or connection between the rotary clamping member and the resiliently mounted locking teeth. The novel manner in which the locking teeth are resiliently supported at the periphery of the bearing section materially contributes toward the efficient functioning of the locking device.

It will be noted that the flanges or wall sections are slightly chamfered to facilitate application thereof to the clamping member or nut. The bottom edges of the nut might also be chamfered slightly, if desired.

Obviously the invention is not limited to the elements as specifically shown herein, but is capable of other modifications and changes limited only by the scope of the appended claims.

Having thus described my invention, what I claim as new and desire to secure by Letters Patent is:

1. A locking device for rotary members having a clamping surface, including an apertured body portion of spring stock adapted to provide a bearing section for and make plane contact with the clamping surface of said rotary member, coupling means extending from said bearing section for engaging the periphery of said rotary clamping member to rotate therewith in a tightening direction, and an external locking tooth resiliently supported by and projecting outside said bearing section at the periphery thereof and adapted to lockingly engage a work piece in response to axial force exerted by the clamping member against said bearing section.

2. A locking device for rotary members having a clamping surface, including an apertured body portion of spring stock adapted to provide a bearing section for the clamping surface of said rotary member, coupling means including flange members extending from said bearing section for engaging the periphery of said rotary clamping member to rotate therewith in a tightening direction, and an external locking tooth resiliently supported by and projecting outside the periphery of said bearing section and adapted to lockingly engage a work piece in response to axial force exerted by the clamping member against said bearing section.

3. A locking device for rotary members having a clamping surface, including an apertured body portion of spring stock, coupling means extending from said body portion for engaging the periphery of a rotary clamping member, a flange member resiliently connected with said body portion, and a locking tooth connected with said flange member and normally projecting beyond said bearing section at the periphery thereof for lockingly engaging a work piece.

4. A locking device for rotary members having a clamping surface, including an apertured body portion of spring stock, coupling means extending from said body portion for engaging the periphery of a rotary clamping member to rotate in a tightening direction therewith, a resilient member supported by and extending in a given direction out of the plane of said body portion, and a work engaging tooth connected to said resilient member and projecting beyond said body portion in a direction angularly disposed to the direction of action of said resilient member.

5. A combined rotary clamping member and locking device including a rotary threaded member having a clamping surface, an apertured body portion of spring stock complementary to and engaging the clamping surface of said rotary member, means extending outside said body portion at the periphery thereof and coupled with the periphery of said rotary member, and an external tooth normally projecting beyond said body portion and adapted to lockingly engage a work piece in response to rotation experienced by said clamping member.

6. A combined rotary clamping member and locking device including a rotary threaded member having a clamping surface, an apertured body portion of spring stock complementary to and engaging the clamping surface of said rotary member, coupling means including members extending from said body portion and frictionally gripping the periphery of said rotary member, and an external tooth normally projecting beyond said body portion at the periphery thereof and adapted to lockingly engage a work piece in response to rotation experienced by said clamping member.

7. A locking device for rotary members having a clamping surface, including an apertured body portion of spring stock adapted to provide a bearing section for the clamping surface of said rotary member, coupling means including wall surfaces extending from said bearing section adapted to engagingly receive complementary peripheral surfaces of said rotary clamping member, and an external locking tooth resiliently supported by said bearing section at the periphery thereof and adapted to lockingly engage a work piece in response to axial force exerted by the clamping member against said bearing section.

CARL G. OLSON.